No. 636,667. Patented Nov. 7, 1899.
C. HONSON.
POTATO PLANTER.
(Application filed Jan. 4, 1896.)

(No Model.) 2 Sheets—Sheet 1.

Witnesses: Inventor:

No. 636,667. Patented Nov. 7, 1899.
C. HONSON.
POTATO PLANTER.
(Application filed Jan. 4, 1896.)
(No Model.) 2 Sheets—Sheet 2.

Witnesses:
Lyman Lindley
Alex Kuhn

Inventor:
Cornelius Honson

THE NORRIS PETERS CO., PHOTO-LITHO., WASHINGTON, D. C.

UNITED STATES PATENT OFFICE.

CORNELIUS HONSON, OF SMYRNA, MICHIGAN, ASSIGNOR OF ONE-HALF TO JACOB KUHN, JR., OF BELDING, MICHIGAN.

POTATO-PLANTER.

SPECIFICATION forming part of Letters Patent No. 636,667, dated November 7, 1899.

Application filed January 4, 1896. Serial No. 574,397. (No model.)

*To all whom it may concern:*

Be it known that I, CORNELIUS HONSON, residing at Smyrna, in the county of Ionia and State of Michigan, have invented an Improvement in Potato-Planters, of which the following is a specification.

My invention relates to a machine adapted to be drawn by horses or propelled by any mechanical motor. It opens furrows, drops potatoes or pieces therein, and covers the potatoes to the requisite depth. The features of novelty are the valve mechanism for conveying the potatoes into the furrows and mechanism for throwing such valve mechanism into and out of connection with one of the transporting-wheels of the machine. The potatoes are fed to the machine preferably by hand, which plants them in two rows of hills simultaneously, said rows being three feet apart either way across the field.

The arrangement and operation of parts are as hereinafter described, reference being had to the accompanying drawings, (two sheets,) in which—

Figure 1:
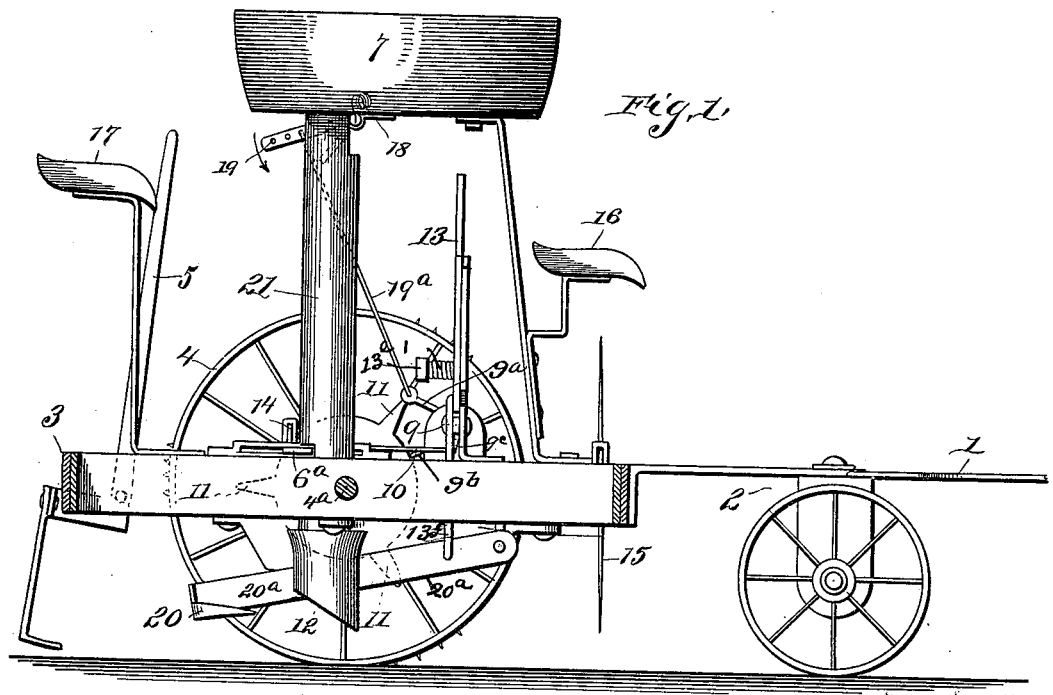
Figure 2:
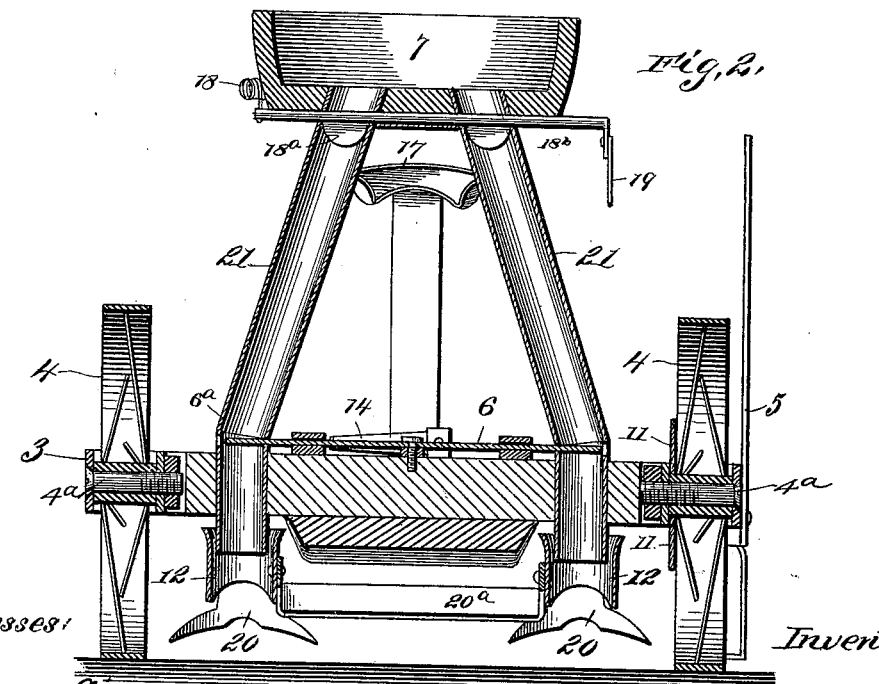
Figure 3:
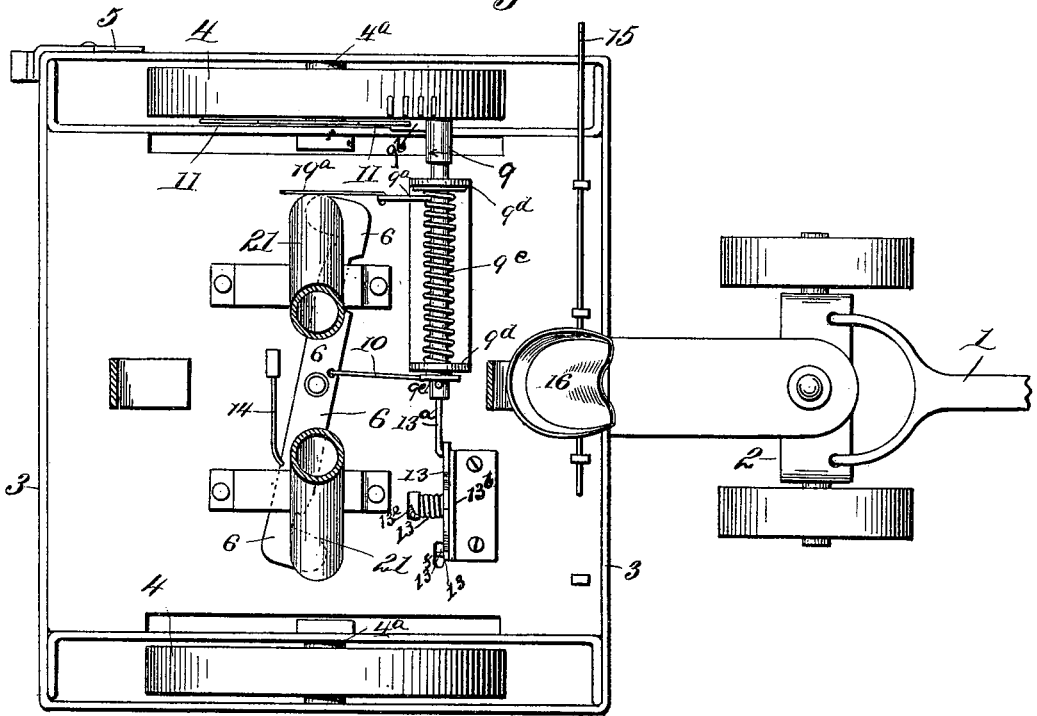
Figure 4:
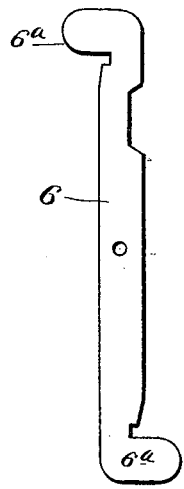
Figure 5:
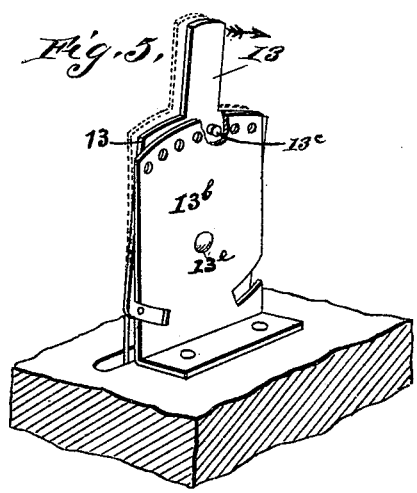

Figure 1 is a vertical longitudinal section of the machine. Fig. 2 is a vertical transverse section of the same; Fig. 3, a horizontal section of the machine. Fig. 4 is a plan view of the lower cut-off. Fig. 5 is a perspective view of the means for throwing the dropping mechanism and furrow-openers out of action.

The tongue 1 is attached to the truck 2, on which the front end of the frame 3 of the machine is pivoted, (see Figs. 1 and 3,) while the body of said frame is supported by large wheels 4, having short axles $4^a$.

A hopper 7 is supported upon two tubes 21, through which the potatoes are conveyed into cylindrical furrow-openers 12, having shovel-points, as shown in Fig. 1. These devices 12, as well as the furrow-closers 20, are attached to a hinged frame $20^a$, which may be adjusted vertically, as hereinafter described.

The potatoes are deposited in the hopper 7 or in the tubes 21 themselves by a person termed the "feeder," who occupies the rear seat 17. The front seat 16 is for the driver of the planter. The passage of potatoes or pieces thereof through the tubular conductors 21 is primarily regulated by valves $18^a$, attached to a rocking bar or shaft $18^b$, arranged horizontally in bearings beneath the hopper 7, the valves being semicircular plates that extend into and oscillate vertically in the tubes 21. A spring 18 holds the shaft $18^b$ so that the valves $18^a$ normally interrupt the passages 21, as shown by dotted lines, Fig. 1. The shaft $18^b$ has an arm 19, which is connected by a rod $19^a$ with a corresponding arm $9^a$ of a rock-shaft 9. The latter is journaled on the platform of frame 3 and has an arm or finger $9^b$, (see Fig. 3,) which engages points of the tappet-wheel 11, fast on an axle $4^a$. It is apparent that as the machine is drawn forward the tappet-wheel rotates, and thus rocks the shaft 9, which in turn oscillates shaft $18^b$ and its valves $18^a$.

The inner end of rock-shaft 9 has a crank-arm $9^c$, from which a rod 10 extends to a flat plate 6, that serves as a second valve or cut-off for arresting the descent of potatoes in the tubes 21. Such cut-off is pivoted centrally between the latter and arranged flat upon the platform of frame 3. It works in slotted guides, and its ends have semicircular projections $6^a$, that enter slots in tubes 21. The cut-off 6 is held in normal position, Figs. 1 and 2, by means of a plate-spring 14, Fig. 3, and the action of said spring also serves to hold the rock-shaft 9 normally retracted, so that its finger $9^b$ is in position to engage the tappet-wheel 11.

The upper valves $18^a$ and cut-off valves 6 are operated simultaneously to allow or arrest delivery of potatoes through the tubes 21. It is obvious this operation goes on as long as the machine advances, so that the shaft 9 is acted upon by the tappet 11. To throw the shaft 9 out of action, it is adapted to slide longitudinally in its bearing $9^d$, Fig. 3, so that its arm $9^b$ may be moved out of alinement with the tappet 11. This sliding movement is resisted by a spiral spring which is coiled about shaft 9 between its bearings $9^d$ and is compressed whenever the latter is pushed back. Such retraction is effected by means of a vertical lever 13 and rod $13^a$, which latter connects the lower end of said lever with inner end of shaft 9. The lever 13 is pivoted to a fixed vertical plate $13^b$, having a series of holes in its upper portion to receive a stud 13ᶜ, (see Fig. 5,) which is fixed on the lever.

A spiral spring 13ᵈ, Figs. 1 and 3, is applied to the elongated pivot 13ᵉ of the lever 13 and serves to hold the stud 13ᶜ normally engaged with one of the holes in the plate or stand 13ᵇ.

The upper end of the lever 13 is formed as a handle, and by pressing laterally upon the same in a direction at a right angle to the stand 13ᵇ it is apparent the spring 13ᵈ will allow the lever to yield sufficiently to cause withdrawal of stud 13ᶜ from a hole in the stand 13ᵇ, whereupon the lever may be pushed and rocked on its pivot 13ᵉ in direction of the arrow, Fig. 5, so as to draw the shaft 9 lengthwise, and thus remove its arm 9ᵇ out of engagement with tappet 11. Then the lever being released its stud 13ᶜ will enter another hole in the stand 13ᵇ, and thus lock the lever in its new position, whereby the shaft 9 is held retracted and the machine may be drawn from one place to another without operating the valve mechanism. The described movement of the lever 13 in direction of the arrow also has the effect of raising the hinged frame 20ᵃ, that carries the furrow-openers 12 and closers 20, since the lever is connected with said frame by means of a rod 13ᶠ, that passes through the platform of the machine. Thus the lever 13 serves to adjust the valves and furrow opening and closing devices simultaneously, so as to hold both locked out of action or to allow both to be thrown into action, as the case may be.

A device 15, Figs. 1 and 3, used for marking off the ground, may be carried in guides on the front of the platform.

What I claim is—

1. In a potato-planter, the combination, with tubes through which the potatoes are conveyed into the furrows, of valves arranged in said tubes, a rock-shaft to which the said valves are attached, a spring for holding the rock-shaft in normal position, transporting-wheels, a tappet-wheel arranged on the same, a rock-shaft having an arm for engaging the tappet-wheel, and means which connect the two rock-shafts, whereby as the machine advances the valved rock-shaft is oscillated, as shown and described.

2. In a potato-planter, the combination with transporting-wheels and a tappet-wheel affixed to one of them, of a spring-retracted rock-shaft which is slidable in its bearings and provided with a lateral projection adapted to engage the tappet-wheel, a lever for sliding the rock-shaft, to remove it from engagement with the tappet-wheel, conductors or tubes for conveying potatoes into the furrows, a rock-shaft provided with valves working in said tubes, and means for connecting with the two rock-shafts, substantially as shown and described.

3. In a potato-planter, the combination, with a pivoted frame, and furrow-openers carried thereby, of a lever connected with said frame, the transporting-wheels, a tappet-wheel affixed to one of them, a slidable rock-shaft engaging said tappet-wheel, tubes for conveying the potatoes into the furrows, valves working therein, and means for connecting them with the rock-shaft, and devices connecting the said lever and rock-shaft, whereby, upon operating the lever, the machine is thrown out of action, substantially as shown and described.

4. In a potato-planter, the combination with valve mechanism for governing dropping of the potatoes, and devices for operating said mechanism, of a lever which is connected with said devices and provided with a lateral stud, a fixed stand having holes for receiving said stud, a pivot for the lever and a spring applied to the pivot for holding the lever in normal engagement with said stand, substantially as set forth.

CORNELIUS HONSON.

Witnesses:
ADAM WAGNER,
HENRY HUMPHREY.